(12) United States Patent
Chen (10) Patent No.: US 11,463,568 B2
(45) Date of Patent: Oct. 4, 2022

(54) CAMERA MODULE AND ELECTRONIC DEVICE

(71) Applicant: GUANGDONG OPPO MOBILE TELECOMMUNICATIONS CORP., LTD., Guangdong (CN)

(72) Inventor: Biao Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/069,281

(22) Filed: Oct. 13, 2020

(65) Prior Publication Data

US 2021/0029231 A1    Jan. 28, 2021

Related U.S. Application Data

(63) Continuation of application No. PCT/CN2019/086973, filed on May 15, 2019.

(30) Foreign Application Priority Data

Jun. 14, 2018 (CN) .......................... 201820929365.6

(51) Int. Cl.
*H04N 5/225* (2006.01)
*H04M 1/02* (2006.01)

(52) U.S. Cl.
CPC ........ *H04M 1/0264* (2013.01); *H04N 5/2254* (2013.01); *H04N 5/2257* (2013.01)

(58) Field of Classification Search
CPC ............................ H04N 5/2258; H04M 1/0264

USPC ........................................................ 348/374
See application file for complete search history.

(56) References Cited

U.S. PATENT DOCUMENTS

| 6,038,286 A | 3/2000 | Wagli et al. |
|---|---|---|
| 9,285,566 B2 * | 3/2016 | Chan .................... H04N 5/2254 |
| 2009/0051804 A1 | 2/2009 | Nomura et al. |
| 2015/0042870 A1 | 2/2015 | Chan et al. |

(Continued)

FOREIGN PATENT DOCUMENTS

| CN | 107517285 A | 12/2017 |
|---|---|---|
| CN | 107613173 A | 1/2018 |

(Continued)

OTHER PUBLICATIONS

Indian Examination Report for IN Application 202017046232 dated Jul. 23, 2021. (5 pages).

(Continued)

*Primary Examiner* — Anthony J Daniels
(74) *Attorney, Agent, or Firm* — Young Basile Hanlon & MacFarlane, P.C.

(57) ABSTRACT

Disclosed are a camera module and an electronic device. The camera module comprises at least two cameras. Two cameras of the at least two cameras are disposed in parallel; incident optical axes of the two cameras are parallel to each other; each camera includes a reflecting element, an optical lens assembly and a photosensitive element; and reflecting optical axes of the two cameras are consistent or parallel to each other. The incident light is reflected by the reflecting element and passes through the optical lens assembly and is then imaged on the photosensitive element.

18 Claims, 8 Drawing Sheets

(56) References Cited

U.S. PATENT DOCUMENTS

| | | | |
|---|---|---|---|
| 2015/0286033 A1* | 10/2015 | Osborne | G02B 17/0852 |
| | | | 348/345 |
| 2016/0112637 A1* | 4/2016 | Laroia | H04N 5/2257 |
| | | | 348/221.1 |
| 2016/0241764 A1 | 8/2016 | Luo et al. | |
| 2018/0091795 A1* | 3/2018 | Hsu | H04N 5/23287 |
| 2018/0176471 A1* | 6/2018 | Wippermann | H04N 5/232 |
| 2018/0364450 A1* | 12/2018 | Lee | G02B 7/18 |
| 2019/0250312 A1* | 8/2019 | Moon | H04N 5/2259 |

FOREIGN PATENT DOCUMENTS

| | | |
|---|---|---|
| CN | 107864316 A | 3/2018 |
| CN | 107948470 A | 4/2018 |
| CN | 208386734 U | 1/2019 |
| EP | 1928219 A2 | 6/2008 |
| WO | 2015058153 A1 | 4/2015 |

OTHER PUBLICATIONS

International Search Report and Written Opinion for related International application No. PCT/CN2019/086973, dated Jul. 29, 2019 (12 pages).

European Search Report for EP Application No. 19819572.9 dated Mar. 17, 2021 (7 pages).

Communication pursuant to Article 94(3) EPC for EP Application 19819572.9 dated May 18, 2022. (6 pages).

* cited by examiner

CAMERA MODULE AND ELECTRONIC DEVICE

CROSS-REFERENCE TO RELATED APPLICATION(S)

This application is a continuation application of International (PCT) Patent Application No. PCT/CN2019/086973, filed on May 15, 2019, which claims priority to Chinese Patent Application No. 201820929365.6, filed on Jun. 14, 2018, the contents of both of which are herein incorporated by reference in their entireties.

TECHNICAL FIELD

The described embodiments relates to the field of consumer electronic products, and in particular, to a camera module and an electronic device.

BACKGROUND

In recent years, with the rapid development of smart phones, the design requirements for cameras of mobile phones have become higher and higher. At present, most cameras in the industry of the mobile phones use vertical lenses.

SUMMARY

In some embodiments of the present disclosure, a camera module and an electronic device may be disclosed.

In some embodiments of the present disclosure, a camera module may be disclosed. The camera module may include a first camera and a second camera, wherein the first camera and the second camera are arranged next to each other, each of the first camera and the second camera comprises a reflective element, an optical lens group, and a photosensitive element; an incident optical axis of the first camera is substantially parallel to an incident optical axis of the second camera; a reflective optical axis of the first camera is substantially coincident with or parallel to a reflective optical axis of the second camera; and light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image.

In some embodiments of the present disclosure, an electronic device may be disclosed. The electronic device may include a housing and the camera module as previously described. The camera module may be arranged on the housing.

Additional aspects and advantages of the present disclosure will be given in part in the following description, part of which will become apparent from the following description, or be learned through the practice of the present disclosure.

BRIEF DESCRIPTION OF DRAWINGS

The above-mentioned and/or additional aspects and advantages of the present disclosure will become obvious and easy to understand from the description of the embodiments in conjunction with the following drawings. In the following.

DETAILED DESCRIPTION

The embodiments of the present disclosure will be described in detail with reference to the accompanying drawings. Same or similar reference numerals indicate same or similar elements or an element having same or similar functions throughout.

The embodiments described below with reference to the accompanying drawings are examples and are only for the purpose of explaining the present disclosure, and should not be construed as limiting the present disclosure.

In the present disclosure, unless explicitly stated and limited otherwise, the first feature being "above" or "under" the second feature may include the first and second features being in direct contact, and may also include the first and second features being in indirect contact but in contact through another feature between the first and second features. Moreover, the first feature may be "on", "above" and "on a top side of" the second feature, including that the first feature may be directly above and obliquely above the second feature, or merely indicates that the first feature may be higher in level than the second feature. The first feature may be "under", "below", and "on a bottom side of" the second feature, including that the first feature may be directly under and obliquely under the second feature, or merely indicating that a horizontal height of the first feature may be less than that of the second feature.

In some aspects of the present disclosure, a camera module may be disclosed. The camera module may include a first camera and a second camera, wherein the first camera and the second camera are arranged next to each other, each of the first camera and the second camera comprises a reflective element, an optical lens group, and a photosensitive element; an incident optical axis of the first camera is substantially parallel to an incident optical axis of the second camera; a reflective optical axis of the first camera is substantially coincident with or parallel to a reflective optical axis of the second camera; and light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image.

In some embodiments, each of the first camera and the second camera further comprises a package shell; the reflective element, the optical lens group, and the photosensitive element are all packaged in the corresponding package shell; or each of the first camera and the second camera further comprises a package shell and a receiving element, and the receiving element is configured to receive the optical lens group; the reflective element, the receiving element, and the photosensitive element are all packaged in the corresponding package shell.

In some embodiments, each package shell comprises a package substrate, a package sidewall, and a package top; the package sidewall is connected between the package substrate and the package top, a light-incident window is defined on the package top, and the light-incident window is located correspondingly to the reflective element.

In some embodiments, the light-incident window of the first camera is flush with the light-incident window of the second camera, and the package substrate of the first camera is flush with the package substrate of the second camera.

In some embodiments, the package sidewall of the first camera abuts against the package sidewall of the second camera; or the package sidewall of the first camera is spaced apart from the package sidewall of the second camera.

In some embodiments, each package sidewall defines a notch, each of the first camera and the second camera further comprises a circuit board assembly, the circuit board assembly is electrically connected to the photosensitive element and exposed from the corresponding notch.

In some embodiments, the package sidewall comprises: a first sidewall; a second sidewall, disposed oppositely to the first sidewall; wherein the first sidewall and the second sidewall are substantially perpendicular to the reflective optical axis of the corresponding one of the first camera and the second camera; a third sidewall, and a fourth sidewall, disposed oppositely to the third sidewall; wherein the third sidewall and the fourth sidewall are substantially parallel to the reflective optical axis of the corresponding one of the first camera and the second camera; the notch is defined in the third sidewall or the fourth sidewall defined in the corresponding one of the first camera and the second camera.

In some embodiments, the reflective element is a prism, and the reflective element comprises a light-incident surface, a light-exiting surface, and a reflective surface. The light-incident surface is substantially perpendicular to the light-exiting surface and disposed correspondingly to the light-incident window, the reflective surface is connected to the light-incident surface and the light-exiting surface and configured to reflect the light entering the first camera and the second camera through the corresponding light-incident window.

In some embodiments, each of the first camera and the second camera further comprises a supporting element, and the supporting element abuts against the reflective element and the package shell, respectively.

In some embodiments, a direction along which the first camera and the second camera are arranged is substantially perpendicular to a direction along which the reflective optical axes of the first camera and the second camera are located.

In some embodiments, the reflective element of the first camera is disposed away from the reflective element of the second camera, and the photosensitive element of the first camera is disposed oppositely to the photosensitive element of the second camera.

In some aspects of the present disclosure, an electronic device may be disclosed. The electronic device may include a housing and the camera module as previously described. The camera module may be arranged on the housing.

In some aspects of the present disclosure, an electronic device may be disclosed. The electronic device may include a housing and a camera module, disposed on the housing and comprising a first camera and a second camera. The first camera and the second camera are arranged in a row, each of the first camera and the second camera comprises a reflective element, an optical lens group, and a photosensitive element. An incident optical axis of the first camera is substantially parallel to an incident optical axis of the second camera. A reflective optical axis of the first camera is substantially coincident with or parallel to a reflective optical axis of the second camera. Light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image. An optical axis of the light reflected by the reflective element of each of the first camera and the second camera coincides with an optical axis of the optical lens group of the corresponding one of the first camera and the second camera and a central normal line of the photosensitive element of the corresponding one of the first camera and the second camera.

Figure 1A:
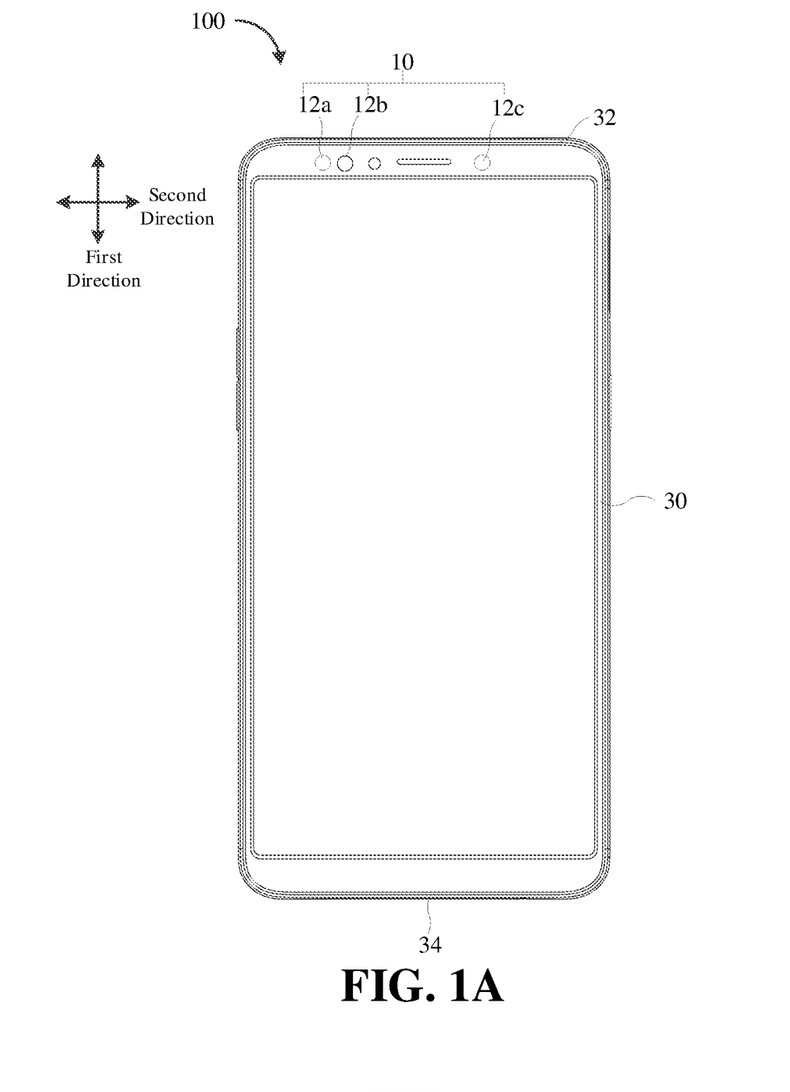
FIGS. 1A and 1B are a schematic structural view of an electronic device according to some embodiments of the present disclosure.
Figure 1B:
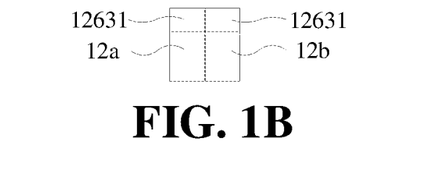
Figure 2:
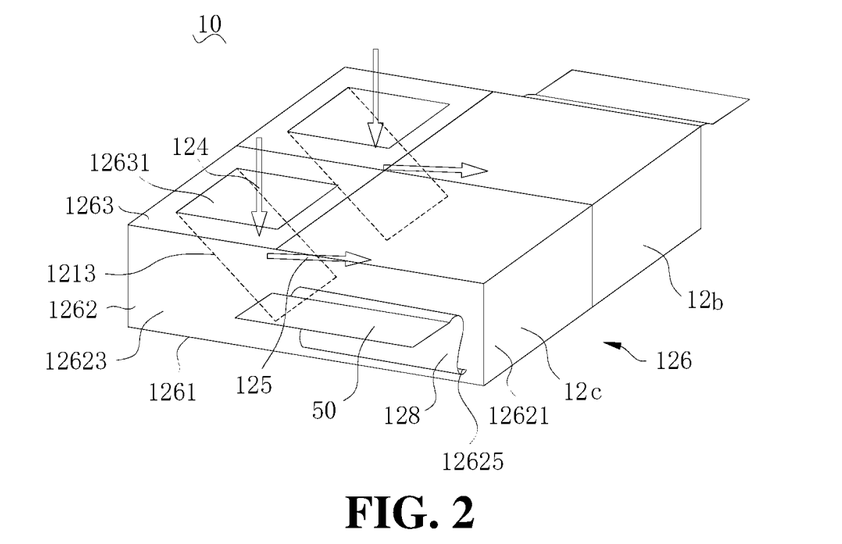
FIG. 2 is a schematic structural view of a camera module according to some embodiments of the present disclosure.
Figure 3:
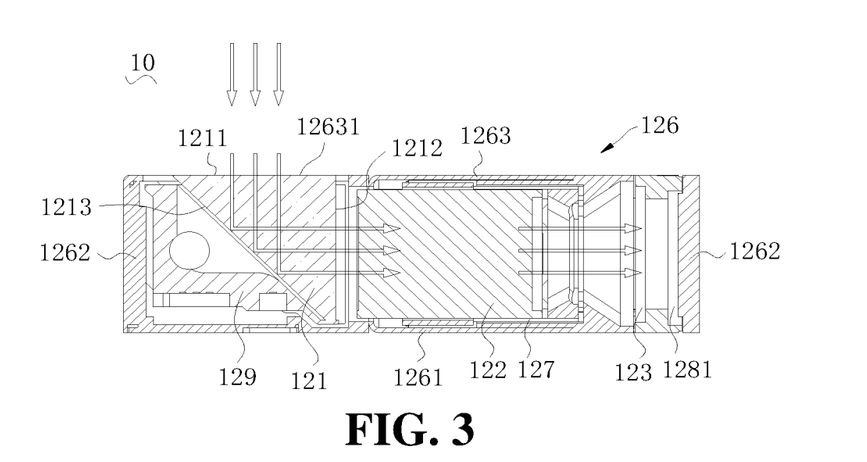
FIG. 3 is a cross-sectional view of the camera module according to some embodiments of the present disclosure.

As shown in FIGS. 1 to 3 together, in some embodiments of the present disclosure, a camera module 10 may be disclosed. The camera module 10 may include at least two cameras. In some embodiments, the camera module 10 may include a first camera 12*a*, a second camera 12*b*, and at least one third camera 12*c*. The first camera 12*a* and the second camera 12*b* may be arranged next to and parallel to each other and further spaced apart from each other. Incident optical axes 124 of the first and second cameras 12*a* and 12*b* arranged next to each other are substantially parallel to each other. Each of the first camera 12*a*, the second camera 12*b*, and the third camera 12*c* may include a reflective element 121, an optical lens group 122, and a photosensitive element 123. Reflective optical axes 125 of the first and second cameras 12*a* and 12*b* may be substantially coincident with or parallel to each other, that is to say, the reflective optical axis 125 of the first camera 12*a* may be coincident with or parallel to the reflective optical axis 125 of the second cameras 12*b*. Incident light may be reflected by the reflective element 121 of each of the first camera 12*a*, the second camera 12*b*, and the third camera 12*c*, pass through the optical lens group 122 of the corresponding one of the first camera 12*a*, the second camera 12*b*, and the third camera 12, and further incident on photosensitive element 123 of the corresponding one of the first camera 12*a*, the second camera 12*b*, and the third camera 12 to form an image. In some embodiments, the incident optical axes 124 of the first and second cameras 12*a* and 12*b* may be substantially perpendicular to the reflective optical axes 125 of the first and second cameras 12*a* and 12*b*. In some embodiments, the incident optical axes 124 of the first and second cameras 12*a* and 12*b* may also be substantially perpendicular to an optical axis of the optical lens group 122.

In some embodiments, the number of the third cameras 12c may be one, two, or more. However, in some embodiments, it is also possible to provide no third camera 12c in the camera module 10, that is to say, the camera module 10 may include only the first camera 12a and the second camera 12b.

As shown in FIG. 2 and FIG. 3. In some embodiments, each of the first camera 12a, the second camera 12b, and the third camera 12c may further include a package shell 126. The reflective element 121, the optical lens group 122, and the photosensitive element 123 may be all packaged in the corresponding package shell 126.

As shown FIG. 3, in some embodiments, each of the first camera 12a, the second camera 12b, and the third camera 12c may further include a receiving element 127. The receiving element 127 may be configured to receive the optical lens group 122. In case that the receiving element 127 is provided, the optical lens group 122 may be received in the receiving element 127, while the reflective element 121, the receiving element 127, and the photosensitive element 123 may be all packaged in the package shell 126.

As shown FIG. 3, in some embodiments, each package shell 126 may include a package substrate 1261, a package sidewall 1262, and a package top 1263. The package sidewall 1262 may be connected between the package top 1263 and the package substrate 1261. In some embodiments, the package sidewall 1262 may extend from the package substrate 1261. A light-incident window 12631 may be defined on the package top 1263, and the light-incident window 12631 may be disposed correspondingly to the reflective element 121. In this way, the light may be incident into the reflective element 121 via the light-incident window 12631.

As shown in FIG. 2, in some embodiments, the light-incident windows 12631 of the first and second cameras 12a and 12b may be flush with each other or at the same level with each other. The package substrates 1261 of the first and second cameras 12a and 12b may be flush with each other or at the same level with each other.

Figure 9:
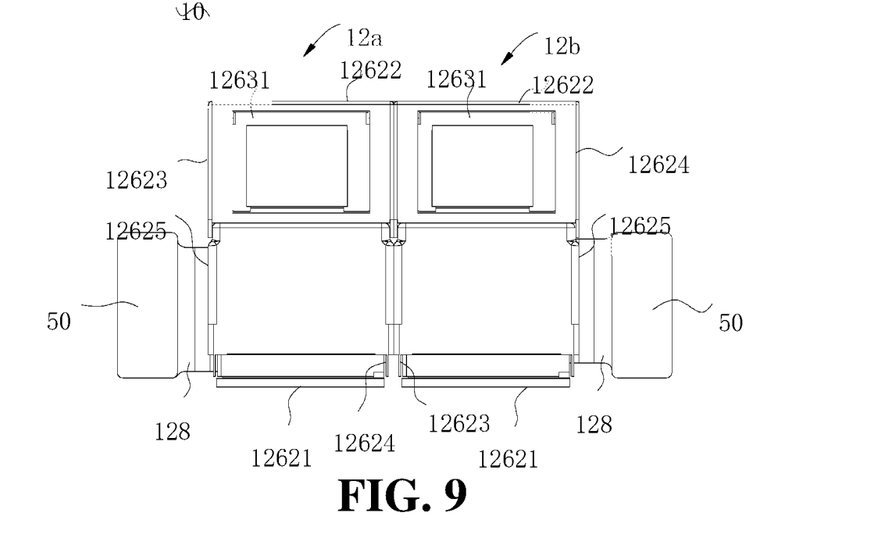
FIG. 9 is a schematic plan view of a camera module according to some embodiments of the present disclosure.

As shown in FIG. 2 and FIG. 9, in some embodiments, the package sidewalls 1262 of the first and second cameras 12a and 12b may abut against each other. Or, in some embodiments, the package sidewalls 1262 of the first and second cameras 12a and 12b may be spaced apart from each other.

As shown FIGS. 2 and 3, in some embodiments, the package sidewall 1262 of each of the first camera 12a, the second camera 12b, and the third camera 12c may define a notch 12625. Each of the first camera 12a, the second camera 12b, and the third camera 12c may further include a circuit board assembly 128. The circuit board assembly 128 may be electrically connected to the photosensitive element 123, and may be exposed from the corresponding notch 12625.

As shown FIG. 3, in some embodiments, the reflective element 121 may be a prism or a mirror.

As shown FIG. 3, in some embodiments, the reflective element 121 may be the prism. The reflective element 121 may include a light-incident surface 1211, a light-exiting surface 1212, and a reflective surface 1213. The light-incident surface 1211 may be substantially perpendicular to the light-exiting surface 1212 and may be disposed correspondingly to the light-incident window 12631, such that the light may be incident into the light-incident surface 1211 via the light-incident window 1231. The reflective surface 1213 may be connected to the light-incident surface 1211 and the light-exiting surface 1212. The reflective surface 1213 may be configured to reflect the light beam entering the corresponding camera from the light-incident window 12631.

As shown FIG. 3, in some embodiments, each of the first camera 12a, the second camera 12b, and the third camera 12c may further include a supporting element 129. The supporting element 129 may abut against the corresponding reflective element 121 and the package shell 126, respectively. The supporting element 129 may be configured to support the reflective element 121.

As shown FIGS. 1A and 1B, in some embodiments of the present disclosure, an electronic device 100 may also be disclosed. The electronic device 100 may include a housing 30 and the camera module 10 as described in any of the above embodiments. The camera module 10 may be arranged on the housing 30.

As shown in FIGS. 1A and 1B, in some embodiment of the present disclosure, the electronic device 100 may include the housing 30 and the camera module 10. The camera module 10 may be arranged on the housing 30. The electronic device 100 may be a mobile phone, a tablet computer, a notebook computer, a smart bracelet, a smart watch, a smart helmet, smart glasses, and the like. In some embodiments of the present disclosure, the electronic device 100 may be described by taking a mobile phone as an example. It may be understood that the electronic device 100 may be implemented in other forms, and the specific forms of the electronic device 100 may be not limited here.

The housing 30 may be configured as a mounting carrier of the camera module 10, or in other words, the camera module 10 may be arranged in the housing 30. The housing 30 may include a top 32 and a bottom 34. The camera module 10 may be disposed between the top 32 and the bottom 34.

The camera module 10 may include at least two cameras. More specifically, the camera module 10 may include two cameras, three cameras, four cameras, or more cameras. In some embodiments of the present disclosure, the camera module 10 including two cameras may be taken as an example for description. As shown in FIG. 2, in some embodiments, the camera module 10 may include the first camera 12a and the second camera 12b, and the first camera 12a and the second camera 12b may be arranged next to and parallel to each other. One of the first camera 12a and the second camera 12b may be a black-and-white camera, and the other of the first camera 12a and the second camera 12b may be an RGB (Red Green Blue) camera. Or, in some embodiments, one of the first camera 12a and the second camera 12b may be an infrared camera, and the other of the first camera 12a and the second camera 12b may be the RGB camera. Or, in some embodiments, one of the first camera 12a and the second camera 12b may be the RGB camera, and the other of the first camera 12a and the second camera 12b may be also the RGB camera. Or, in some embodiments, one of the first camera 12a and the second camera 12b may be a wide-angle camera, and the other of the first camera 12a and the second camera 12b may be a telephoto camera, and the like. As shown FIG. 3, each of the first camera 12a and the second camera 12b may include the reflective element 121, the optical lens group 122, and the photosensitive element 123. The incident optical axes 124 of the first camera 12a and the second camera 12b (that is, the optical axes of the light incident on the reflective elements 121 of the first camera 12a and the second camera 12b) may be substantially parallel to each other (as shown in FIG. 2), and the reflective optical axes 125 of the first camera 12a and the second camera 12b (that is, the optical axes of the light reflected by the reflective elements 121 of the first camera 12a and the second camera 12b) may be substantially coincident with or substantially parallel to each other. In some embodiments, the reflective optical axes 125 of the first camera 12a and the second camera 12b being substantially coincident with each other means that, the reflective optical axes 125 of the first camera 12a and the second camera 12b are located in the same straight line.

Figure 4A:
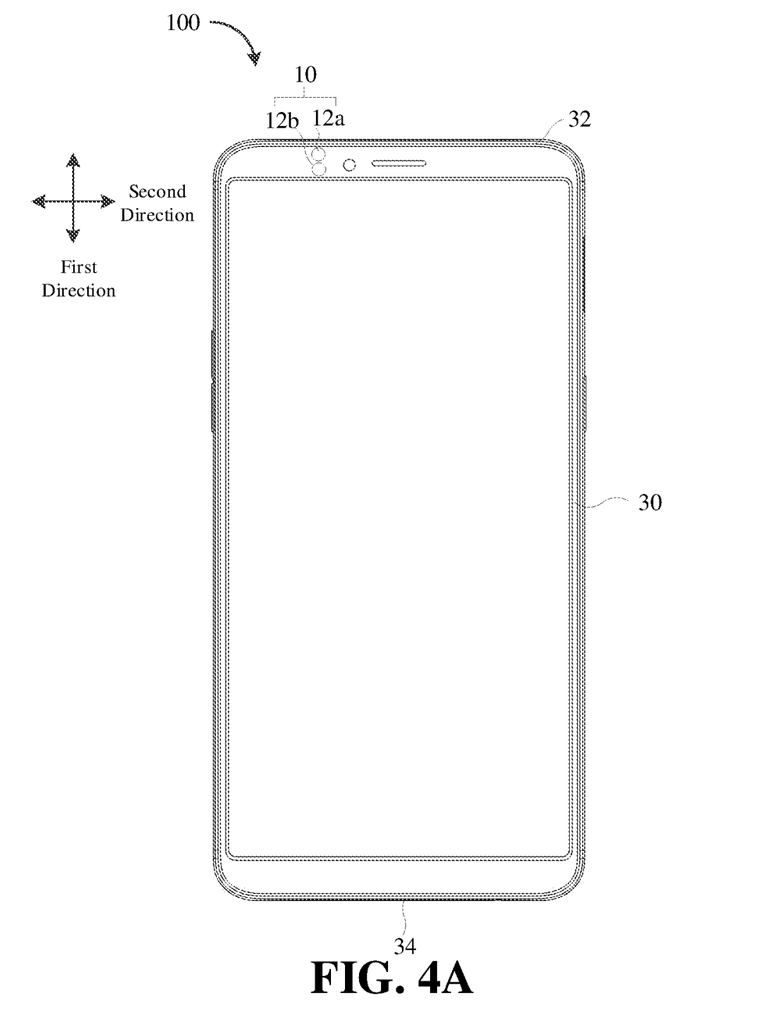
FIGS. 4A and 4B are a schematic structural view of an electronic device according to some embodiments of the present disclosure.
Figure 4B:
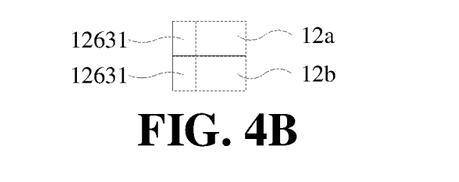
Figure 5A:
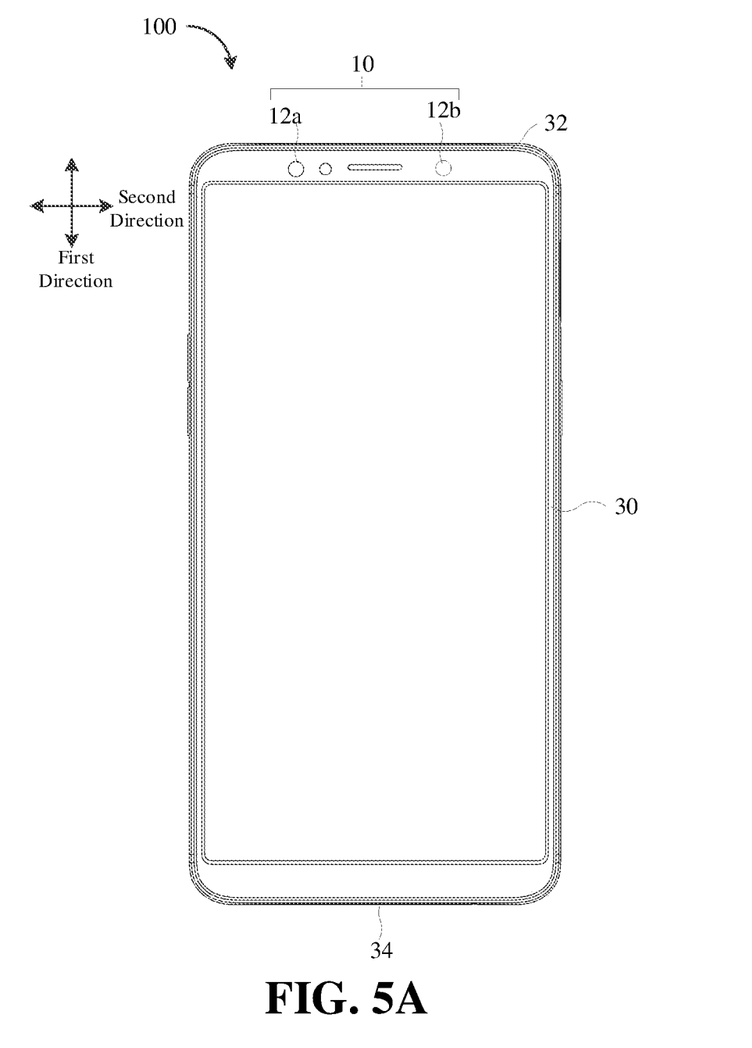
FIGS. 5A and 5B are a schematic structural view of an electronic device according to some embodiments of the present disclosure.
Figure 5B:
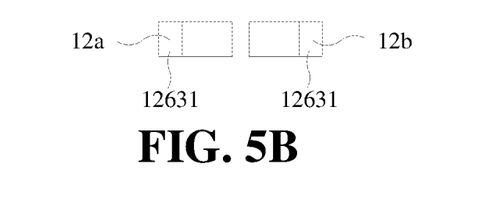

More specifically, a direction directed from the top 32 to the bottom 34 of the housing 30 may be defined as a first direction, and a direction substantially perpendicular to the first direction may be defined as a second direction. When the camera module 10 is configured to perform the front shooting of the mobile phone, as shown in FIGS. 4A and 4B, the first camera 12a and the second camera 12b may be arranged in a row along the first direction. At this time, the reflective optical axes 125 of the first camera 12a and the second camera 12b may be substantially parallel to each other and located along the second direction, and the first camera 12a and the second camera 12b may abut against each other or be spaced apart from each other. Or, in some embodiments, as shown FIGS. 1A and 1B, the first camera 12a and the second camera 12b may be arranged in a row along the second direction. At this time, the reflective optical axes 125 of the first camera 12a and the second camera 12b may be parallel to each other and located along the first direction, and the first camera 12a and the second camera 12b may abut against each other or may be spaced apart from each other. Or, as shown FIGS. 5A and 5B, the first camera 12a and the second camera 12b may be arranged in a row along the second direction. At this time, the reflective optical axes 125 of the first camera 12a and the second camera 12b may be coincident with each other and located along the second direction, and the first camera 12a and the second camera 12b may abut against each other or may be spaced apart from each other. Furthermore, the reflective elements 121 of the first camera 12a and the second camera 12b may be disposed away from each other, and the photosensitive elements 123 of the first camera 12a and the second camera 12b may be disposed opposite to each other.

Figure 6A:
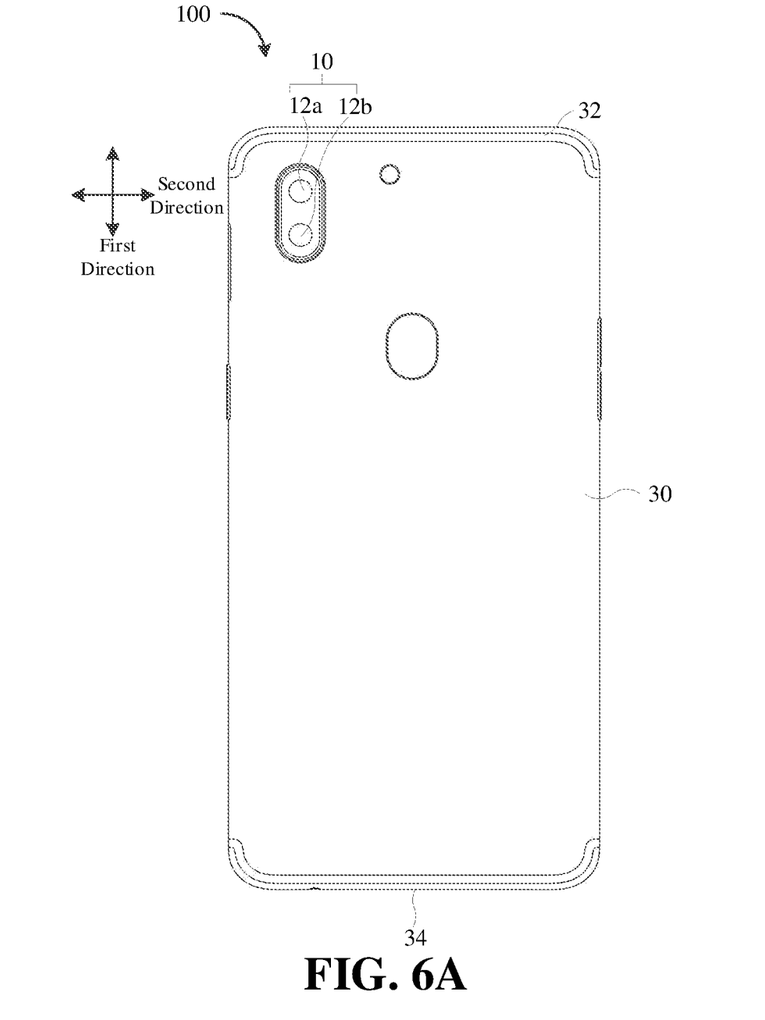
FIGS. 6A and 6B are a schematic structural view of an electronic device according to some embodiments of the present disclosure.
Figure 6B:
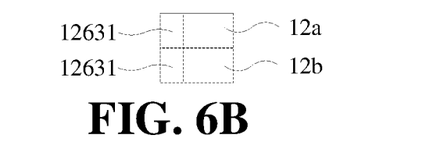
Figure 7A:
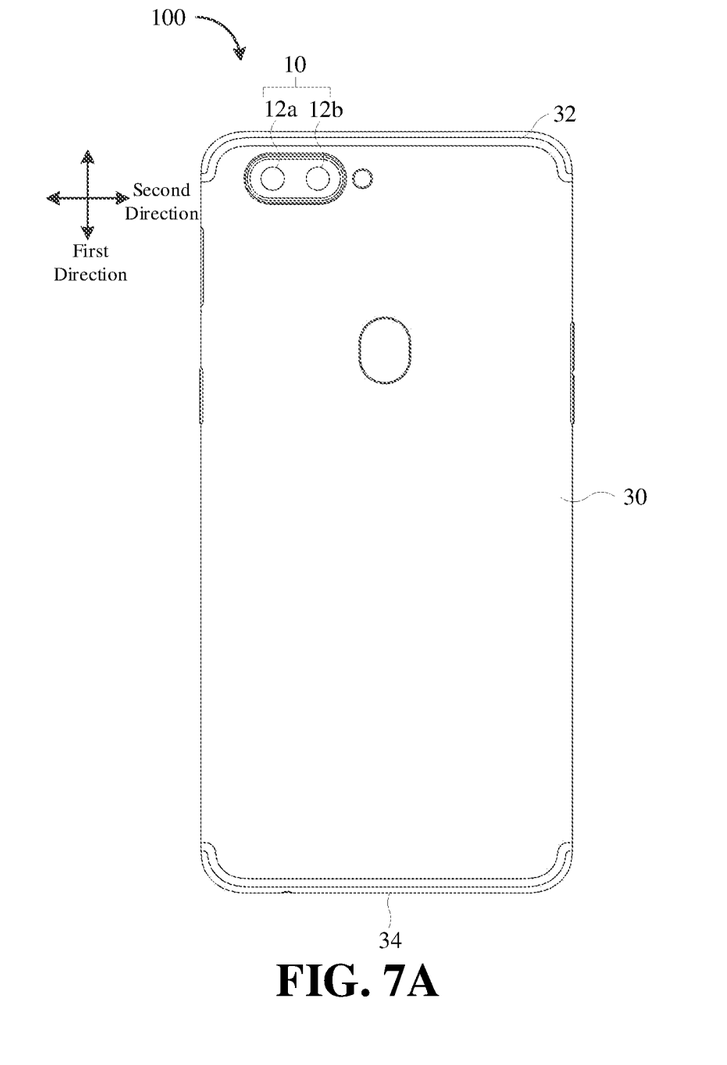
FIGS. 7A and 7B are a schematic structural view of an electronic device according to some embodiments of the present disclosure.
Figure 7B:
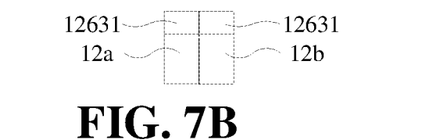
Figure 8A:
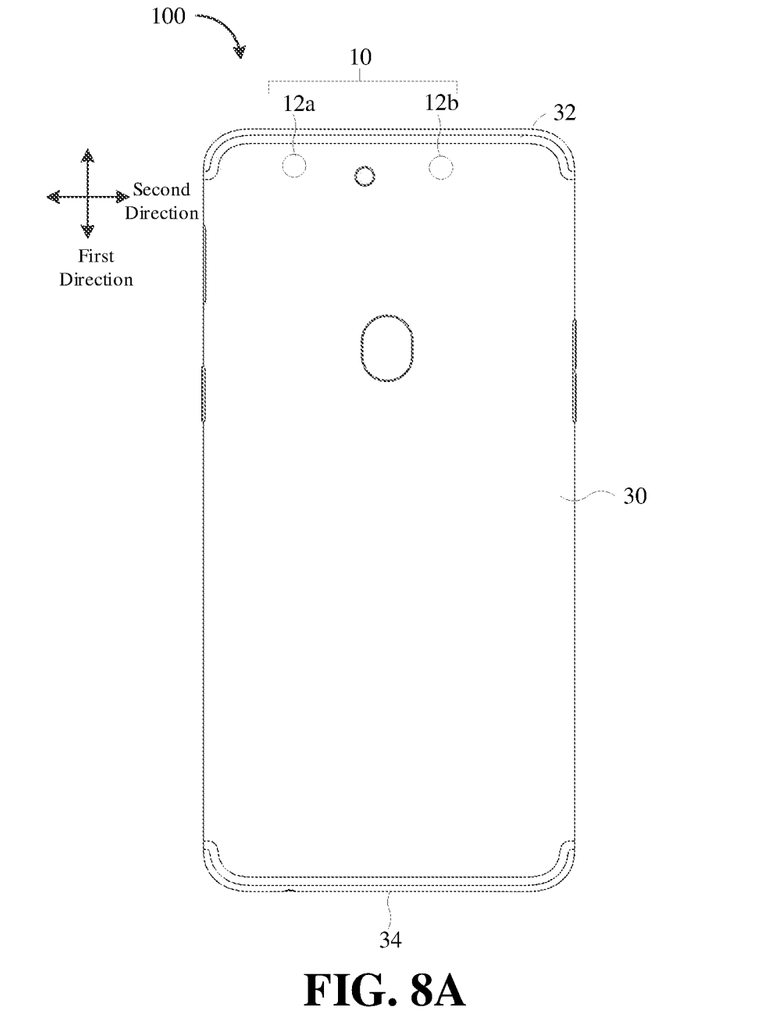
FIGS. 8A and 8B are schematic structural view of an electronic device according to some embodiments of the present disclosure.
Figure 8B:
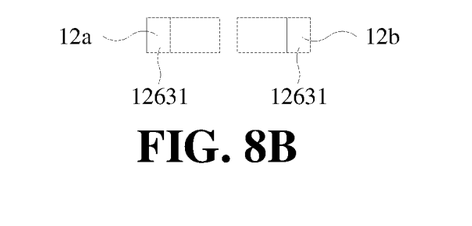

When the camera module 10 is configured to perform the rear shooting of the mobile phone, as shown in FIGS. 6A and 6B, the first camera 12a and the second camera 12b may be arranged in a row along the first direction. At this time, the reflective optical axes 125 of the first camera 12a and the second camera 12b may be substantially parallel to each other and located along the second direction, and the first camera 12a and the second camera 12b may abut against each other or may be spaced apart from each other. Or, in some embodiments, as shown FIGS. 7A and 7B, the first camera 12a and the second camera 12b may be arranged in a row along the second direction. At this time, the reflective optical axes 125 of the first camera 12a and the second camera 12b may be parallel to each other and located along the first direction, and the first camera 12a and the second camera 12b may abut against each other or may be spaced apart from each other. Or, as shown FIGS. 8A and 8B, the first camera 12a and the second camera 12b may be arranged in a row along the second direction. At this time, the reflective optical axes 125 of the first camera 12a and the second camera 12b may be coincident with each other and located along the second direction, and the first camera 12a and the second camera 12b may abut against each other or may be spaced apart from each other. Furthermore, the reflective elements 121 of the first camera 12a and the second camera 12b may be disposed away from each other, and the photosensitive elements 123 of the first camera 12a and the second camera 12b may be disposed oppositely to each other.

In some embodiments, an arranged direction of the first camera 12a and the second camera 12b (that is, a direction along which the first camera 12a and the second camera 12b are arranged) may be substantially perpendicular to a direction along which the reflective optical axes 125 of the first camera 12a and the second camera 12b are located.

It may be understandable that, most of the cameras in the industry of the mobile phones currently use vertical lenses, and the height of the vertical lens is great, such that it is difficult to reduce an overall thickness of the mobile phone, or the camera may protrude out of a housing of the mobile phone, which may affect an appearance of the mobile phone. Even in some dual-camera modules, one camera adopts a periscope lens, but the other cameras may still adopt vertical lenses. Thus, the overall thickness of the mobile phone cannot be effectively reduced. Besides, a great height difference exits between mirror surfaces of the two cameras, and a height of the periscope lens has to be adapted to a height of the vertical lens, which is unfavorable for the structural design and appearance experience of the mobile phone. Herein, the "vertical lens" means that, the optical axis of the lens is a straight line, or to say, the incident light is transmitted to a photosensitive device of the lens along the direction of a linear optical axis.

In the camera module 10 according to some embodiments of the present disclosure, each of the first camera 12a and the second camera 12b adopts a periscope lens, which reduces the overall height of the camera module 10. In this way, it is possible to make the electronic device 100 thinner, and the first camera 12a and the second camera 12b will not protrude out of the housing 30, and the appearance of the electronic device 100 may be more beautiful.

When the camera module 10 is configured to acquire two different picture information for integration to acquire a high-resolution and high-dynamic-range image or to achieve an optical zoom, the distance between the first camera 12a and the second camera 12b may be set closer, as shown in FIGS. 1, 4, 6, and 7. When the camera module 10 is configured to generate a stereo vision, acquire an image depth, perform a 3D imaging, assist focusing, recognizing a motion, and the like, the distance between the first camera 12a and the second camera 12b may be set farther, as shown in FIGS. 5 and 8.

As further shown in FIG. 2 and FIG. 3, each of the camera 12a and the second camera 12b may further include the package shell 126. The package shell 126 may be configured to simultaneously package the reflective element 121, the optical lens group 122, and the photosensitive element 123. Or, in other words, the reflective element 121, the optical lens group 122, and the photosensitive element 123 may be packaged in the package shell 126 at the same time. In some embodiments of the present disclosure, centers of the reflective element 121, the optical lens group 122, and the photosensitive element 123 of the corresponding one of the camera 12a and the second camera 12b may be sequentially located in a same line, respectively. In other embodiments, each of the camera 12a and the second camera 12b may further include a ring-shaped receiving element 127. The receiving element 127 may be configured to receive the optical lens group 122 to fix and protect the optical lens group 122. At this time, the optical lens group 122 may be received in the receiving element 127, and the package shell 126 may package or encapsulate or receive the reflective element 121 and the receiving element 127, and the photosensitive element 123.

Each packaging housing 126 may include the packaging substrate 1261, the packaging sidewall 1262, and the packaging top 1263. The packaging substrate 1261 may be configured to carry the reflective element 121, the optical lens group 122, and the photosensitive element 123. The package sidewall 1262 may be arranged around or surround the reflective element 121, the optical lens group 122, and the photosensitive element 123. The package sidewall 1262 may extend from the package substrate 1261, and may be connected to the package substrate 1261. In some embodiments, the package sidewall 1262 may be detachably connected to the package substrate 1261, to facilitate the assembly of the reflective element 121, the optical lens group 122, and the photosensitive element 123. The package top 1263 may be disposed oppositely to the package substrate 1261, and the package top 1263 may be connected to the package sidewall 1262. The light-incident window 12631 may be defined on the package top 1263, and the light-incident window 12631 may be disposed correspondingly to the reflective element 121. The light outside the package shell 126 may be incident into the reflective element 121 through the light-incident window 12631, reflected by the reflective element 121, and then incident into the photosensitive element 123 after transmitting through the optical lens group 122, and thus an image may be formed on the photosensitive element 123.

When the camera 12 is an infrared camera, in some examples, the light-incident window 12631 may be a through hole, and the package top 1263 may be made of a material that does not transmit the infrared light. In some examples, the package top 1263 may be a combination of a material that does not transmit the infrared light and a material that transmits the infrared light. More specifically, the light-incident window 12631 may be made of the material that transmits the infrared light, and the rest part of the package top 1263 may be made of material that does not transmit the infrared light. In some embodiments of the present disclosure, each of the camera 12a and the second camera 12b may further include an infrared light-transmitting filter located between the optical lens group 122 and the photosensitive element 123. The light-transmitting filter may be configured to adjust a wavelength range of the light of the image, and specifically configured to block visible light and allow the infrared light to enter the photosensitive element 123.

When the camera 12 is not an infrared camera, for example, when the camera 12 is an RGB camera, in some examples, the light-incident window 12631 may be a through hole, and the packaging top 1263 may be made of an opaque material. In some examples, the packaging top 1263 may be a combination of the opaque material and a light-transmitting material. More specifically, the light-incident window 12631 may be made of the light-transmitting material, and the rest part of the package top 1263 may be made of the opaque material. In some embodiments of the present disclosure, the camera 12 may further include an infrared-cutting filter located between the optical lens group 122 and the photosensitive element 123. The infrared-cutting filter may be configured to adjust a wavelength range of the light of the image, and specifically configured to block the infrared light from entering the photosensitive element 123. In this way, it is possible to reduce the impact of the infrared light on a color and a clarity of a normal image.

In some embodiments, the light-incident windows 12631 of the first camera 12a and the second camera 12b, may be flush (the term "flush" herein means that heights of the two components may be at the same level) with each other, and the packaging substrates 1261 of the first camera 12a and the second camera 12b may also be flush with each other. In this way, the first camera 12a and the second camera 12b may have the same heights, which may facilitate reducing the overall height of the camera module 10. Thus, it is possible to make the electronic device 100 thinner, and the appearance of the electronic device 100 may be more beautiful.

As shown FIG. 3, the reflective element 121 may be disposed at a light-incident side of the optical lens group 122. The reflective element 121 may be a prism or a mirror. More specifically, the prism and the mirror may be configured to reflect light to change a direction of a light path, and may have a compact structure and a small size, which may facilitate the miniaturization of the camera module 10. Of course, the type of the reflective element 121 may be not limited to this. In other embodiments, other types of reflective elements 121 may be used as required. In some embodiments of the present disclosure, the reflective element 121 may be described by taking a prism as an example. The reflective element 121 may include the light-incident surface 1211, the light-exiting surface 1212, and the reflective surface 1213. The light-incident surface 1211 may be substantially perpendicular to the light-exiting surface 1212, and may be disposed correspondingly to the light-incident window 12631. The reflective surface 1213 may be connected to the light-incident surface 1211 and the light-exiting surface 1212. The reflective surface 1213 may be configured to reflect the light beam entering the light-incident window 12631.

The optical lens group 122 may include one lens or a plurality of lenses arranged coaxially in sequence. A surface of each lens may be any of aspheric, spherical, Fresnel, and binary optical surfaces, and the like. The lenses may all be made of glass material to solve the problem of temperature drift of the lens when the ambient temperature changes. Or, in some embodiments, the lenses may be made of plastic material, so as to reduce the cost and facilitate mass production.

The photosensitive element 123 may be implemented as a Complementary Metal Oxide Semiconductor (CMOS) photosensitive element or a Charge-coupled Device (CCD) photosensitive element.

When assembling the above-mentioned camera 12, the optical lens group 122 may be firstly arranged on the packaging substrate 1261, and then the reflective element 121 and the photosensitive element 123 may be arranged on two opposite sides of the optical lens group 122, such that the optical axis of the light beam reflected by the reflective element 121 may coincide with the optical axis of the optical lens group 122 and a central normal line (that is, a normal line at a center) of the photosensitive element 123.

As shown in FIG. 2 and FIG. 3, in some embodiments, the package sidewall 1262 may define the notch 12625. Each of the first camera 12a and the second camera 12b may further include the circuit board assembly 128. The circuit board assembly 128 may be electrically connected to the photosensitive element 123, and may be exposed out from the notch 12625. The circuit board assembly 128 may include a circuit board 1281. The circuit board 1281 may be any one of a printed circuit board (PCB), a flexible circuit board (FPC), or a combination of a rigid board and a flexible board. One end of the circuit board 1281 may be received in the package shell 126 and electrically connected to the photosensitive element 123. The other end of the circuit board 1281 may extend out of the package shell 126 from the notch 12625 and may be connected to a main board 50 of the electronic device 100. In some embodiments of the present disclosure, the circuit board 1281 may be a combination of the rigid board and the flexible board. The rigid board of the circuit board 1281 may be received in the package shell 126 and may be electrically connected to the photosensitive element 123, and the flexible board of the circuit board 1281 may extend out of the package shell 126 from the notch 12625 and may be connected to the main board 50 of the electronic device 100. The photosensitive element 123 may perform photoelectric conversion on the incident light and output a conversion signal to the main board 50 of the electronic device 100 via the circuit board assembly 128 for imaging and other processing.

As further shown in FIG. 9, the package sidewall 1262 may include a first sidewall 12621, a second sidewall 12622, a third sidewall 12623, and a fourth sidewall 12624. The first sidewall 12621 may be disposed oppositely to the second sidewall 12622, and the third sidewall 12623 may be disposed oppositely to the fourth sidewall 12624. The first sidewall 12621 and the second sidewall 12622 may be substantially perpendicular to the reflective optical axis 125 of the corresponding one of the first camera 12a and the second camera 12b. The third sidewall 12623 and the fourth sidewall 12624 may be substantially parallel to the reflective optical axis 125 of the corresponding one of the first camera 12a and the second camera 12b.

In some examples as shown in FIG. 9, the notch 12625 defined in the first camera 12a may be defined in the third sidewall 12623 of the first camera 12a, and the circuit board assembly 128 of the first camera 12a may be disposed on the first sidewall 12621 of the first camera 12a and exposed out from the notch 12625 defined in the third sidewall 12623 of the first camera 12a. The notch 12625 defined in the second camera 12b may be defined in the fourth sidewall 12624 of the second camera 12b. The circuit board assembly 128 of the second camera 12b may be disposed on the first sidewall 12621 of the second camera 12b and exposed out from the notch 12625 defined in the fourth sidewall 12624 of the second camera 12b. The fourth sidewall 12624 of the first camera 12a may abut against the third sidewall 12623 of the second camera 12b. In this way, the camera module 10 may have a small volume, which may facilitate the miniaturization of the electronic device 100.

Figure 10:
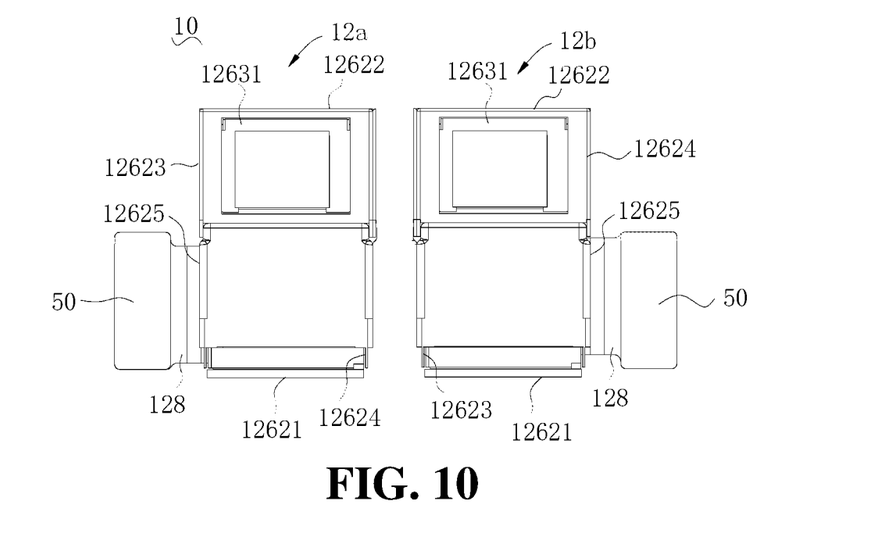
FIG. 10 is a schematic plan view of a camera module according to some embodiments of the present disclosure.

Of course, in some embodiments, the fourth sidewall 12624 of the first camera 12a may be spaced apart from the third sidewall 12623 of the second camera 12b. At this time, as shown FIG. 10, the third sidewall 12623 of the first camera 12a may define the notch 12625, and the circuit board assembly 128 of the first camera 12a may be disposed on the first sidewall 12621 of the first camera 12a and may be exposed out from the notch 12625 defined in the third sidewall 12623 of the first camera 12a. The fourth sidewall 12624 of the second camera 12b may define another notch 12625. The circuit board assembly 128 of the second camera 12b may be disposed on the first sidewall 12621 of the second camera 12b and may be exposed out from the notch 12625 defined in the fourth sidewall 12624 of the second camera 12b. Or, in some embodiments, the fourth sidewall 12624 of the first camera 12a may define the notch 12625, the circuit board assembly 128 of the first camera 12a may be disposed on the first sidewall 12621 of the first camera 12a and exposed out from the notch 12625 defined in the fourth sidewall 12624 of the first camera 12a, the fourth sidewall 12624 of the second camera 12b may define another notch 12625, and the circuit board assembly 128 of the second camera 12b may be disposed on the first sidewall 12621 of the second camera 12b and exposed out from the notch 12625 defined in the fourth sidewall 12624 of the second camera 12b. Or in some embodiments, the third sidewall 12623 of the first camera 12a may define the notch 12625, the circuit board assembly 128 of the first camera 12a may be disposed on the first sidewall 12621 of the first camera 12a and exposed out from the notch 12625 defined in the third sidewall 12623 of the first camera 12a, the third sidewall 12623 of the second camera 12b may define another notch 12625, and the circuit board assembly 128 of the second camera 12b may be disposed on the first sidewall 12621 of the second camera 12b and exposed out from the notch 12625 defined in the third sidewall 12623 of the second camera 12b. Or in some embodiments, the fourth sidewall 12624 of the first camera 12a may define the notch 12625, the circuit board assembly 128 of the first camera 12a may be disposed on the first sidewall 12621 of the first camera 12a and exposed out from the notch 12625 defined in the fourth sidewall 12624 of the first camera 12a, the third sidewall 12623 of the second camera 12b may define another notch 12625, and the circuit board assembly 128 of the second camera 12b may be disposed on the first sidewall 12621 of the second camera 12b and may be exposed out from the notch 12625 defined in the third sidewall 12623 of the second camera 12b.

In some embodiments, when the first and second cameras 12a and 12b abut against each other (herein, "abut against" refers to close to or attach to), the first and second cameras 12a and 12b may share the package sidewalls 1262 abut against each other, or the first and second cameras 12a and 12b may use one packaging shell 126 for packaging, and the like.

As shown in FIGS. 3 and 9 together, in some embodiments, each of the first camera 12a and the second camera 12b may further include the supporting element 129. The supporting element 129 may abut against both the reflective element 121 and the package shell 126, respectively. More specifically, the supporting element 129 may abut against the packaging substrate 1261 and the second sidewall 12622. The supporting element 129 may be configured to support the reflective element 121, such that the reflective element 121 may be maintained at a predetermined tilt angle, for example, the reflective surface 1213 of the reflective element 121 may be maintained at an angle of 45 degrees from the packaging substrate 1261.

The reflective element 121 may be fixed on the supporting element 129 via a curable adhesive. In this way, during the assembly of the camera 12, the tilt angle of the reflective element 121 may be adjusted by adjusting a thickness of the curable adhesive at different positions on the supporting element 129, and the adjustment method is simple.

More specifically, the curable adhesive may be firstly coated on a surface of the supporting element 129 that is configured to abut against the reflective element 121. And then, the reflective element 121 may be arranged on the surface, and the reflective element 121 may be connected to the curable adhesive. After that, the reflective element 121 may be actively aligned to adjust the light entering the optical lens group 122. Finally, after the active alignment of the reflective element 121 is completed, the curable adhesive may be cured. In some embodiments, the active alignment performed on the reflective element 121 may include: adjusting the thickness of the curable adhesive at different positions on the support member 129 to adjust the tilt angle of the reflective element 121, such that the reflective optical axis 125 of the camera 12 may be coincident with the optical axis of the optical lens group 122 and the central normal line of the photosensitive element 123, to ensure the imaging quality of the camera 12.

In the description of this specification, reference may be made to the terms "certain embodiments", "one embodiment", "some embodiments", "example embodiments", "examples", "specific examples", or "some examples". The description means that a specific feature, structure, material, or characteristic described in conjunction with the embodiments or examples may be included in at least one embodiment or example of the present disclosure. In this specification, the schematic representations of the above-mentioned terms do not necessarily refer to the same embodiment or example. Moreover, the described specific features, structures, materials, or characteristics may be combined in any one or more embodiments or examples in a suitable manner.

In addition, the terms "first", "second", or the like, may be only configured for descriptive purposes, and may not be understood as indicating or implying relative importance or implicitly indicating the number of indicated technical features. Therefore, the features defined with "first", "second", or the like, may explicitly or implicitly include at least one of the features. In the description of the present disclosure, "a plurality of" means at least two, for example two, three, unless otherwise specifically defined.

Although the embodiments of the present disclosure have been shown and described above, it may be understood that the above embodiments may be examples and should not be construed as limiting the present disclosure. Those skilled in the art may make various changes, modifications, equivalents, and transformation to the above embodiments within the scope of the present disclosure. The scope of the present disclosure may be defined by the claims and their equivalents.

What is claimed is:

1. A camera module, comprising a first camera and a second camera, wherein the first camera and the second camera are arranged next to each other, each of the first camera and the second camera comprises a reflective element, an optical lens group, a photosensitive element, and a package shell; wherein:
    an incident optical axis of the first camera is substantially parallel to an incident optical axis of the second camera;
    a reflective optical axis of the first camera is substantially coincident with or parallel to a reflective optical axis of the second camera;
    light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image;
    the reflective element, the optical lens group, and the photosensitive element are all packaged in the corresponding package shell;
    each package shell comprises a package substrate, a package sidewall, and a package top, the package sidewall is connected between the package substrate and the package top, a light-incident window is defined on the package top, and the light-incident window is located correspondingly to the reflective element; and
    each package sidewall comprises an abutting surface and a non-abutting surface, the abutting surface of the first camera abuts against the abutting surface of the second camera, and the abutting surface of the first camera and the abutting surface of the second camera are substantially parallel to the reflective optical axes of the first camera and the second camera.

2. The camera module as claimed in claim 1, wherein each of the first camera and the second camera further comprises a receiving element configured to receive the optical lens group, wherein the reflective element, the receiving element, and the photosensitive element are all packaged in the corresponding package shell.

3. The camera module as claimed in claim 2, wherein each of the first camera and the second camera further comprises a supporting element, and the supporting element abuts against the reflective element and the package shell, respectively.

4. The camera module as claimed in claim 1, wherein the light-incident window of the first camera is flush with the light-incident window of the second camera, and the package substrate of the first camera is flush with the package substrate of the second camera.

5. The camera module as claimed in claim 1, wherein each package sidewall defines a notch, each of the first camera and the second camera further comprises a circuit board assembly, the circuit board assembly is electrically connected to the photosensitive element and exposed from the corresponding notch.

6. The camera module as claimed in claim 5, wherein the package sidewall comprises:
    a first sidewall;
    a second sidewall, disposed oppositely to the first sidewall;
    wherein the first sidewall comprises a first surface disposed oppositely to the second sidewall, the second sidewall comprises a second surface disposed oppositely to the first sidewall, and the first surface and the second surface are substantially perpendicular to the reflective optical axis of the corresponding one of the first camera and the second camera;
    a third sidewall; and
    a fourth sidewall, disposed oppositely to the third sidewall; and
    wherein the third sidewall comprises one of the abutting surface and the non-abutting surface, the fourth sidewall comprises the other of the abutting surface and the non-abutting surface, and the notch is defined in the non-abutting surface.

7. The camera module as claimed in claim 6, wherein the third sidewall of the first camera comprises the non-abutting surface, and the circuit board assembly of the first camera is disposed on the first sidewall of the first camera and exposed out from the notch; and
    wherein the fourth sidewall of the second camera comprises the non-abutting surface, and the circuit board assembly of the second camera is disposed on the first sidewall of the second camera and exposed out from the notch.

8. The camera module as claimed in claim 1, wherein the reflective element is a prism, and the reflective element comprises a light-incident surface, a light-exiting surface, and a reflective surface;
    wherein the light-incident surface is substantially perpendicular to the light-exiting surface and disposed correspondingly to the light-incident window, the reflective surface is connected to the light-incident surface and the light-exiting surface and configured to reflect the light entering the first camera and the second camera through the corresponding light-incident window.

9. The camera module as claimed in claim 1, wherein the reflective element of the first camera is disposed away from the reflective element of the second camera, and the photosensitive element of the first camera is disposed oppositely to the photosensitive element of the second camera.

10. An electronic device, comprising:
a housing; and
a camera module, disposed on the housing and comprising a first camera and a second camera, wherein the first camera and the second camera are arranged next to each other, each of the first camera and the second camera comprises a reflective element, an optical lens group, a photosensitive element, and a package shell; wherein:
an incident optical axis of the first camera is substantially parallel to an incident optical axis of the second camera;
a reflective optical axis of the first camera is substantially coincident with or parallel to a reflective optical axis of the second camera;
light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image;
the reflective element, the optical lens group, and the photosensitive element are all packaged in the corresponding package shell;
each package shell comprises a package substrate, a package sidewall, and a package top, the package sidewall is connected between the package substrate and the package top, a light-incident window is defined on the package top, and the light-incident window is located correspondingly to the reflective element; and
each package sidewall comprises an abutting surface and a non-abutting surface, the abutting surface of the first camera abuts against the abutting surface of the second camera, and the abutting surface of the first camera and the abutting surface of the second camera are substantially parallel to the reflective optical axes of the first camera and the second camera.

11. The electronic device as claimed in claim 10, wherein each of the first camera and the second camera further comprises a receiving element configured to receive the optical lens group; the reflective element, the receiving element, and the photosensitive element are all packaged in the corresponding package shell.

12. The electronic device as claimed in claim 11, wherein each of the first camera and the second camera further comprises a supporting element, and the supporting element abuts against the reflective element and the package shell, respectively.

13. The electronic device as claimed in claim 10, wherein the light-incident window of the first camera is flush with the light-incident window of the second camera, and the package substrate of the first camera is flush with the package substrate of the second camera.

14. The electronic device as claimed in claim 10, wherein each package sidewall defines a notch, each of the first camera and the second camera further comprises a circuit board assembly, the circuit board assembly is electrically connected to the photosensitive element and exposed from the corresponding notch.

15. The electronic device as claimed in claim 14, wherein the package sidewall comprises:
a first sidewall;
a second sidewall, disposed oppositely to the first sidewall;
wherein the first sidewall comprises a first surface disposed oppositely to the second sidewall, the second sidewall comprises a second surface disposed oppositely to the first sidewall, and the first surface and the second surface are substantially perpendicular to the reflective optical axis of the corresponding one of the first camera and the second camera;
a third sidewall; and
a fourth sidewall, disposed oppositely to the third sidewall; and
wherein the third sidewall comprises one of the abutting surface and the non-abutting surface, the fourth sidewall comprises the other of the abutting surface and the non-abutting surface, and the notch is defined in the non-abutting surface.

16. The electronic device as claimed in claim 15, wherein the third sidewall of the first camera comprises the non-abutting surface, and the circuit board assembly of the first camera is disposed on the first sidewall of the first camera and exposed out from the notch; and
wherein the fourth sidewall of the second camera comprises the non-abutting surface, and the circuit board assembly of the second camera is disposed on the first sidewall of the second camera and exposed out from the notch.

17. The electronic device as claimed in claim 10, wherein the reflective element is a prism, and the reflective element comprises a light-incident surface, a light-exiting surface, and a reflective surface;
wherein the light-incident surface is substantially perpendicular to the light-exiting surface and disposed correspondingly to the light-incident window, the reflective surface is connected to the light-incident surface and the light-exiting surface and configured to reflect the light entering the first camera and the second camera through the corresponding light-incident window.

18. An electronic device, comprising:
a housing; and
a camera module, disposed on the housing and comprising a first camera and a second camera, wherein the first camera and the second camera are arranged in a row, each of the first camera and the second camera comprises a reflective element, an optical lens group, a photosensitive element, and a package shell; wherein:
an incident optical axis of the first camera is substantially parallel to an incident optical axis of the second camera;
a reflective optical axis of the first camera is substantially coincident with or parallel to a reflective optical axis of the second camera;
light is incident into the first camera and the second camera, reflected by the reflective element of each of the first camera and the second camera, passes through the optical lens group of the corresponding one of the first camera and the second camera, and is further incident in the photosensitive element of the corresponding one of the first camera and the second camera to form an image;
an optical axis of the light reflected by the reflective element of each of the first camera and the second camera coincides with an optical axis of the optical lens group of the corresponding one of the first camera and the second camera and a central normal line of the photosensitive element of the corresponding one of the first camera and the second camera;

the reflective element, the optical lens group, and the photosensitive element are all packaged in the corresponding package shell;

each package shell comprises a package substrate, a package sidewall, and a package top, the package sidewall is connected between the package substrate and the package top, a light-incident window is defined on the package top, and the light-incident window is located correspondingly to the reflective element; and each package sidewall comprises an abutting surface and a non-abutting surface, the abutting surface of the first camera abuts against the abutting surface of the second camera; and the abutting surface of the first camera and the abutting surface of the second camera are substantially parallel to the reflective optical axes of the first camera and the second camera.

\* \* \* \* \*